US012741896B2

(12) United States Patent
Rantala et al.

(10) Patent No.: US 12,741,896 B2
(45) Date of Patent: Sep. 22, 2026

(54) TEMPERING FURNACE AND METHOD FOR ASSEMBLING TEMPERING FURNACE

(71) Applicant: Glaston Finland Oy, Tampere (FI)

(72) Inventors: Mikko Rantala, Tampere (FI); Heikki Nurmi, Tampere (FI); Antti Aronen, Tampere (FI); Jari Kurvinen, Tampere (FI); Jukka Vehmas, Tampere (FI)

(73) Assignee: Glaston Finland Oy, Tampere (FI)

( * ) Notice: Subject to any disclaimer, the term of this patent is extended or adjusted under 35 U.S.C. 154(b) by 143 days.

(21) Appl. No.: 18/800,506

(22) Filed: Aug. 12, 2024

(65) Prior Publication Data

US 2025/0059079 A1 Feb. 20, 2025

(30) Foreign Application Priority Data

Aug. 16, 2023 (FI) ..................................... 20235919

(51) Int. Cl.
*C03B 27/012* (2006.01)
*C03B 27/04* (2006.01)
*C03B 27/044* (2006.01)

(52) U.S. Cl.
CPC ........ *C03B 27/012* (2013.01); *C03B 27/0404* (2013.01); *C03B 27/044* (2013.01)

(58) Field of Classification Search
CPC ............................................. C03B 27/04–056
USPC ......................................................... 285/187
See application file for complete search history.

(56) References Cited

U.S. PATENT DOCUMENTS 2,259,741 A * 10/1941 Drake ..................... C03B 35/20 432/152
3,372,016 A * 3/1968 Rahrig .................. C03B 27/044 65/273
3,923,488 A * 12/1975 Pytel ................... C03B 27/0417 65/114

(Continued)

FOREIGN PATENT DOCUMENTS

CN 115650567 A * 1/2023 ........... C03B 27/012
CN 116514379 A 8/2023

(Continued)

OTHER PUBLICATIONS

CN-115650567-A (Xie) Jan. 31, 2023 (English language translation). [online] [retrieved Feb. 20, 2026]. Retrieved from: Clarivate Analytics. (Year: 2023).*

(Continued)

*Primary Examiner* — Erin Snelting
(74) *Attorney, Agent, or Firm* — Boulware & Valoir PLLC

(57) ABSTRACT

A tempering furnace for a glass sheet, and method for assembling the tempering furnace. The furnace comprises a first furnace portion and a second furnace portion attached successively one after another in the lengthwise direction of the furnace. Each of said furnace portions comprises a division channel arranged in the lengthwise direction of the furnace for dividing air to blow enclosures. The first furnace portion is provided with a blower pressurizing air sucked from the tempering furnace and feeding said air to the division channel of said first furnace portion. The division channel of the first furnace portion is connected to the division channel of the second furnace portion for leading air from the blower to said division channel of the second furnace portion.

11 Claims, 3 Drawing Sheets

(56) References Cited

U.S. PATENT DOCUMENTS 3,994,711 A * 11/1976 McMaster ............. C03B 35/164 65/351
3,996,035 A * 12/1976 McHenry ................ C03C 17/00 65/60.52
4,004,901 A * 1/1977 Starr ..................... C03B 27/044 65/114
4,204,845 A * 5/1980 Shields ............... C03B 27/0404 65/25.2
4,300,937 A * 11/1981 Rhonehouse ......... C03B 35/189 65/351
4,481,025 A 11/1984 Rodriguez et al.
5,032,162 A * 7/1991 Reunamaki ........... C03B 27/044 65/114
5,057,138 A * 10/1991 Vehmas .................. C03B 29/08 65/114
5,078,774 A * 1/1992 Vehmas ................ C03B 27/016 65/168
5,150,534 A * 9/1992 Kramer ................. C03B 27/044 242/615.11
6,279,350 B1 * 8/2001 Vehmas ................ C03B 27/044 65/161
6,427,488 B1 * 8/2002 Vitkala ................... C03B 29/08 219/209
6,848,725 B2 * 2/2005 Logan ................... F16L 21/035 29/516
2004/0093904 A1 * 5/2004 Haws ...................... C03B 29/08 65/273
2005/0274373 A1 * 12/2005 Pesonen ................ F27B 9/2407 126/21 A
2012/0171632 A1 7/2012 Novak et al.
2015/0353411 A1 * 12/2015 Nikander ................ C03B 29/08 65/114
2020/0131070 A1 * 4/2020 Lyytikäinen ........ C03B 27/0417
2020/0409394 A1 12/2020 Liu et al.
2021/0380461 A1 * 12/2021 Sulonen .............. C03B 27/0413

FOREIGN PATENT DOCUMENTS

DE 2447411 A1 4/1979
FI 111006 B * 5/2003 ............. C03B 29/08
GB 351862 A 7/1931

OTHER PUBLICATIONS

FI-111006-B (Nikander) May 15, 2003 (English language translation). [online] [retrieved Feb. 20, 2026]. Retrieved from: Clarivate Analytics. (Year: 2003).*
Search Report for Finnish Application No. 20235919 dated Oct. 17, 2023.
European Search Report for Application 24193324 dated Dec. 17, 2024.

* cited by examiner

TEMPERING FURNACE AND METHOD FOR ASSEMBLING TEMPERING FURNACE

PRIOR RELATED APPLICATIONS

This application claims priority to Finnish application number 20235919 filed on Aug. 16, 2023, and incorporated herein in all its entirety.

FEDERALLY SPONSORED RESEARCH STATEMENT

Not applicable.

REFERENCE TO MICROFICHE APPENDIX

Not applicable.

FIELD OF THE DISCLOSURE

The invention relates to a tempering furnace for a glass sheet equipped with convection heating devices. The invention further relates to a method for assembling a tempering furnace using convection heating

BACKGROUND OF THE DISCLOSURE

Dimensions of tempering furnaces for glass sheets are so large than they have to be shipped or transported in several furnace portions or modules. These furnace portions are then attached successively to each other so that the furnace is completed. Each of the furnace portions is provided with a convection heating device that comprises a blower and flowing channels needed for blowing air in the furnace portion to temper or heat the glass sheet therein. A problem is that cost of said modular furnaces are high.

SUMMARY OF THE DISCLOSURE

Viewed from a first aspect, there can be provided a tempering furnace for a glass sheet, comprising a first furnace portion and a second furnace portion attached successively one after another in the lengthwise direction of the furnace, each of said furnace portions comprising a division channel arranged in the lengthwise direction of the furnace for dividing air to blow enclosures which have blow openings from which hot air is discharged as jets towards the glass sheet, wherein the first furnace portion is provided with a blower pressurizing air sucked from the tempering furnace and feeding said air to the division channel of said first furnace portion, and wherein said division channel of the first furnace portion is connected to the division channel of the second furnace portion for leading air from the blower to said division channel of the second furnace portion.

Thereby a tempering furnace the construction of which is simple and cost-effective despite of its modular structure may be achieved. The cost-effective construction is based on a surprising observation that some or even most of the furnace portions may be provided without a blower and electrical components like motor, frequency converter and firing, if division channels of successive furnace portions are connected to each other. Particularly the costs of a blower withstanding high (about 700° C.) temperatures are high. The costs of the blower and its electrical components increases with the size of the blower, but it much more increases with the number of blowers arranged in the tempering furnace. Further, installation costs of the convection heating devices are reduced in about directly proportional to the number of the blowers. Still further, maintenance costs are lowered as the number of components in the tempering furnace is reduced.

Viewed from a further aspect, there can be provided a method for assembling the tempering furnace according to the first aspect, the method comprising:

- providing at least two furnace portions,
- attaching said at least two furnace portions successively one after another in the lengthwise direction of the furnace,
- said attaching comprising connecting division channel(s) of said at least two furnace portions to each other for supplying convection heating air from one of the at least two furnace portions to another of said furnace portions.

Thereby a method for assembling a tempering furnace which is simple and cost-effective despite of the modular structure of said tempering furnace may be achieved.

The arrangement and the method are characterised by what is stated in the independent claims. Some other embodiments are characterised by what is stated in the other claims. Inventive embodiments are also disclosed in the specification and drawings of this patent application. The inventive content of the patent application may also be defined in other ways than defined in the following claims. The inventive content may also be formed of several separate inventions, especially if the invention is examined in the light of expressed or implicit sub-tasks or in view of obtained benefits or benefit groups. Some of the definitions contained in the following claims may then be unnecessary in view of the separate inventive ideas. Features of the different embodiments of the invention may, within the scope of the basic inventive idea, be applied to other embodiments.

Various embodiments of the first aspect may comprise at least one feature from the following paragraphs:

In one embodiment, the division channel of the first furnace portion is connected to the division channel of the second furnace portion by a separate connector element.

An advantage is that a very airtight connection of the division channels may be provided.

In one embodiment, the separate connector element is attached to one of the division channels but arranged movable in relation to another of said division channels.

An advantage is that dimensional changes of the division channels caused by temperature changes may be effectively compensated while the airtightness of the connection is satisfactory.

In one embodiment, the separate connector element is arranged inside of at least one of the connected division channels, preferably inside of both of the connected division channels.

An advantage is that the separate connector element does not obstruct components or structures of the furnace close to the division channels.

In one embodiment, the separate connector element extends to at least one connecting opening of the blow enclosures, and the separate connector element comprises a corresponding opening or openings allowing air flow from the division channel to the blow enclosure(s).

An advantage is that free flowing of air from the division channel to the blow enclosures is ensured, while very airtight connection of the division channels may be provided.

In one embodiment, the separate connector element has a structure being less stiff than the first furnace portion and the second furnace portion in at least the lengthwise direction of the furnace.

An advantage is that dimensional changes of the division channel due to temperature variations may be effectively compensated, while very airtight connection of the division channels may be provided.

In one embodiment, one of the connected division channels is dimensioned to extend inside another of said connected division channels at least when in temperatures prevailing in use of the tempering furnace.

An advantage is that a very simple and inexpensive structure for connecting the division channels may be provided.

In one embodiment, one of the connected division channels has a connection end the cross-section of which is extended, and one end of another of said connected division channels is arranged inside said connection end.

An advantage is that a simple and inexpensive structure for connecting the division channels may be provided.

In one embodiment, one of the connected division channels has a connection end the cross-section of which is reduced, and one end of another of said connected division channels is arranged around said connection end.

An advantage is that a simple and inexpensive structure for connecting the division channels may be provided.

In one embodiment, the connection end is dimensioned for providing a play at room temperature which makes room for the connected division channels to expand due to temperatures prevailing in use of the tempering furnace.

An advantage is that the connection end may move or slide freely in relation to another connected division channel when their temperature is changing. Thus, forces and stresses harmful or damaging to the division channels may be avoided.

In one embodiment, the division channels of two furnace portions are connected.

An advantage is that due to the number of blowers decreasing, the costs caused by the convection heating devices may be considerably reduced.

In one embodiment, the division channels of at least three furnace portions are connected An advantage is that costs of a modular furnace having great length may be decreased because the number of blowers decreases In one embodiment, the division channels of at least three furnace portions are connected and the first furnace portion comprising the blower is arranged between two furnace portions An advantage is that a structure enabling an even air flow over the entire length of the furnace may be achieved.

In one embodiment, the division channel is attached from its middle part to the corresponding furnace portion and wherein the ends of said division channel are free to move due to thermal expansions.

An advantage is that structural stresses of the furnace portions caused by thermal expansions of the division channels may be minimized or even eliminated.

In one embodiment, the tempering furnace comprises the division channels on both sides of the furnace, and the blower is arranged to feed the division channels on both sides of the furnace.

An advantage is that a high air blowing capacity vs. investment costs relation may be achieved.

In one embodiment, the tempering furnace comprises a glass plate conveyor, wherein the division channels, the blow enclosures and the blow openings are arranged for heating a glass sheet arranged on the glass plate conveyor by air jets blown towards at least one surface of said glass plate, and wherein the furnace consists of structurally separate sequentially connected furnace portions equipped with said division channels connected to each other, so that opposite arranged connection ends of the division channels may shift relative to each other as the division channels become thermally expandable and air can flow from one division channel to another division channel.

An advantage is that a construction that is simple, cost-effective and has a high output capacity may be achieved.

BRIEF DESCRIPTION OF THE DRAWINGS

Some embodiments illustrating the present disclosure are described in more detail in the attached drawings, in which.

In the figures, some embodiments are shown simplified for the sake of clarity. Similar parts are marked with the same reference numbers in the figures.

DETAILED DESCRIPTION

Figure 1A:
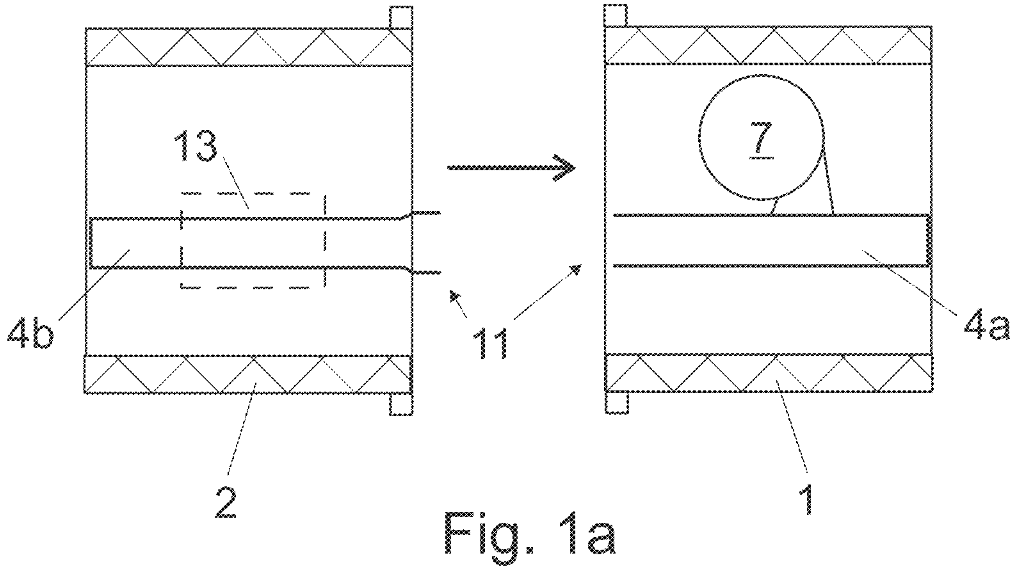
FIG. 1*a* is a schematic side view of two furnace portions and a step of a method for assembling a tempering furnace in partial cross-section.
Figure 1B:
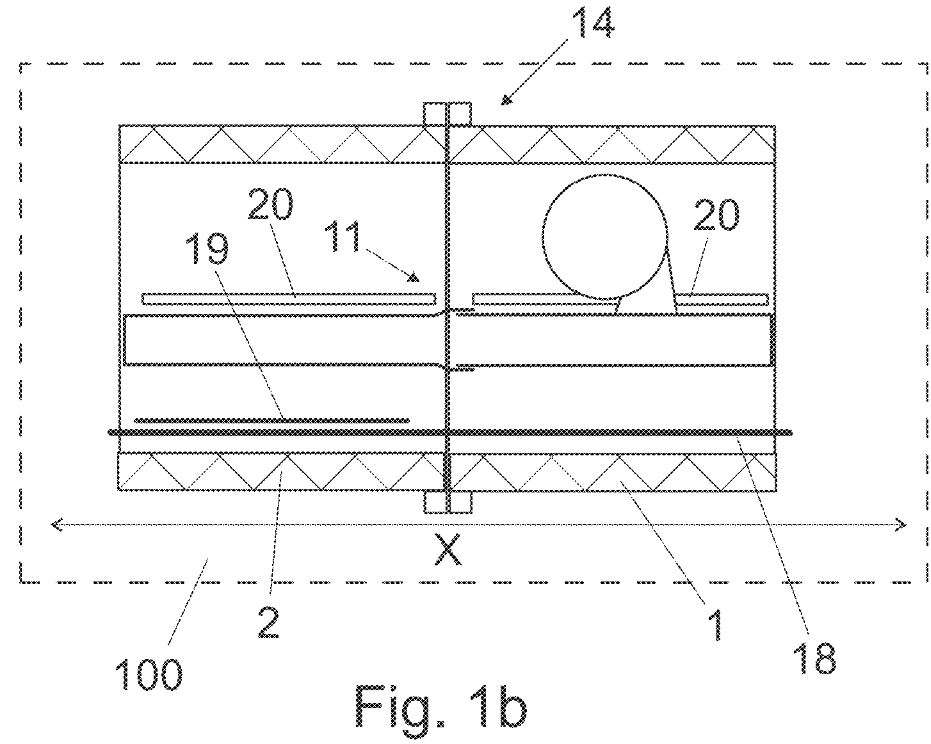
FIG. 1*b* is a schematic side view of the two furnace portions shown in FIG. 1*a* connected and another step of the method for assembling a tempering furnace in partial cross-section.

FIG. 1*a* is a schematic side view of two furnace portions and a step of a method for assembling a tempering furnace in partial cross-section, and FIG. 1*b* is a schematic side view of the two furnace portions shown in FIG. 1*a* connected and another step of the method for assembling a tempering furnace in partial cross-section.

Glass sheets 19 are arranged to move in a tempering or heating furnace 100 (hereafter a furnace) in one direction or back and forth on rotating rollers (not shown) of a glass plate conveyor 18. Then, the glass sheets are moved from the furnace 100, at a tempering temperature, either successively, side by side, or as mixed glass loadings along a roller track (not shown) to a tempering cooling unit (not shown) following the furnace.

The furnace 100 may be a roller furnace provided with a roller track. Alternatively, the furnace 100 may be based on a so-called glass flotation technology, where a glass sheet floats supported by a thin airbed, and touches the rollers of a conveyor track or other conveying members by one of its side edges, only.

In the furnace 100, glass sheets are heated to a tempering temperature that is typically from 610 to 680° C., depending on the thickness of the glass. The temperature inside the furnace 100 is typically 700° C. The heating of a glass sheet typically takes 40 s per one mm of glass thickness, that is, 160 seconds for the glass thickness of 4 mm, for example. The thickness of glass sheets to be tempered is usually 1 to 25 mm.

In the furnace 100 heat or heat energy may be transferred to the glass by radiating from the inner surfaces of the furnace, by convection from air, and by direct conduction from the contact points of the conveyor and the glass sheet. The furnace 100 may be provided with heating elements 20, such as electric resistors. Also gas burners can be used.

The electric resistors are typically oblong elements where a resistance wire is winding around a ceramic core. The heating element 20 may be arranged above or below the glass plate conveyor 18. Additionally or alternatively, the heating element 20 may be arranged inside a blow enclosure 5 (shown in FIG. 4), and/or in connection with a blower 7, such as at the suction inlet of thereof.

The heating elements 20 are typically independently controlled, or they are arranged to groups of heating elements that are independently controlled.

In convection (or to be more precise, forced convection), air streams are directed to the surfaces of the glass sheet by means of a convection heating device. The forced convection in the furnace 100 may be directed to the upper surface of the glass sheet, to the lower surface of the glass sheet, or to both the upper surface and the lower surface of the glass sheet. For simplifying the current disclosure, the Figures are showing embodiments where forced convection is directed only to the upper surface of the glass sheet.

The furnace 100 is constructed from at least two furnace portions. FIGS. 1*a* and 1*b* are showing a first furnace portion 1 and a second furnace portion 2, but it is to be noted that the furnace 100 may comprise three, four or even more furnace portions, even ten (10) etc., depending on the length of the furnace 100. The furnace portions are attached to each other successively one after another in the lengthwise direction X of the furnace. Said lengthwise direction X is the direction in which the glass sheets are arranged to move in the furnace 100.

In one embodiment, all the furnace portions arranged in the furnace have an equal length, or at least substantially equal length in the lengthwise direction of the furnace. In another embodiment, the furnace portions have substantially different lengths.

Each of the furnace portions 1, 2 comprise at least one division channel 4*a*, 4*b* that is arranged in the lengthwise direction X of the furnace. Typically, the division channel extends on the whole length (parallel with the lengthwise direction X of the furnace) of the furnace portion. The cross-sectional shape of the divisional channel 4*a*, 4*b* may be roundish, such as round, or polygonal, such as quadrangular.

The division channel 4*a*, 4*b* is attached to the structure of the corresponding furnace portion 1, 2. In one embodiment, the division channel 4*a*, 4*b* is attached from its middle part 13 to the corresponding furnace portion, whereas the ends of said division channel are free to move due to thermal expansions.

The division channel 4*a*, 4*b* divides air to blow enclosures 5 (shown in FIG. 4) which have blow openings 6 from which hot air is discharged as jets towards the glass sheet(s) arranged in the furnace. When the furnace portions 1, 2 are attached to each other, the division channel 4*a*, 4*b* are connected to each other so that air can flow from one furnace portion to another furnace portion, or more precisely from one divisional channel to another divisional channel. It is to be noted that in embodiments of the furnace 100 comprising more than two furnace portions, the furnace portion(s) arranged between two other furnace portions comprise(s) connection ends 11 at both ends of the division channel.

One of the furnace portions, here the first furnace portion 1, is provided with a blower 7. The blower pressurizes air sucked from the tempering furnace and feeds said air to the division channel 4*a* of said first furnace portion 1. Said division channel 4*a* of the first furnace portion is connected to the division channel 4*b* of the second furnace portion such that air from the blower 7 can flow to the division channel 4*b* of the second furnace portion and from there to the blow enclosures 5 and blow openings 6 arranged in the second furnace portion 2. In other words, hot air pressurized with one blower 7 can be delivered in two (or more) furnace portions and blown therein against glass to be heated.

In one embodiment, one of the division channels is dimensioned to extend inside another of the division channels at least when the furnace 100 is in its heating or tempering use, i.e. when the division channels are expanded due to thermal expansion caused by high temperatures prevailing in the furnace. Then, the case might be that said division channel does not extend inside said another division channel when the furnace is at a lower temperature, e.g. at room temperature. In another embodiment, one of the division channels is dimensioned to extend inside another of the division channels also at room temperature. This is the case in the embodiment shown in FIGS. 1*a*, $\mathbf{1}_b$ where the division channel 4*a* of the first furnace portion extends inside the division channel 4*b* of the second furnace portion.

In one embodiment, such as shown in FIGS. 1*a*, 1*b*, one of the connected division channels 4*a*, 4*b* has a connection end 11 the cross-section of which is extended, and one end of another of said connected division channels 4*a*, 4*b* is arranged inside said extended connection end.

In one embodiment, the furnace 100 comprises two or more blowers 7 arranged in two or more furnace portions, respectively, at least one of which is arranged to deliver air in at least two furnace portions. This is a particularly useful embodiment in long furnaces.

Figures 2, 3, 4, 5:
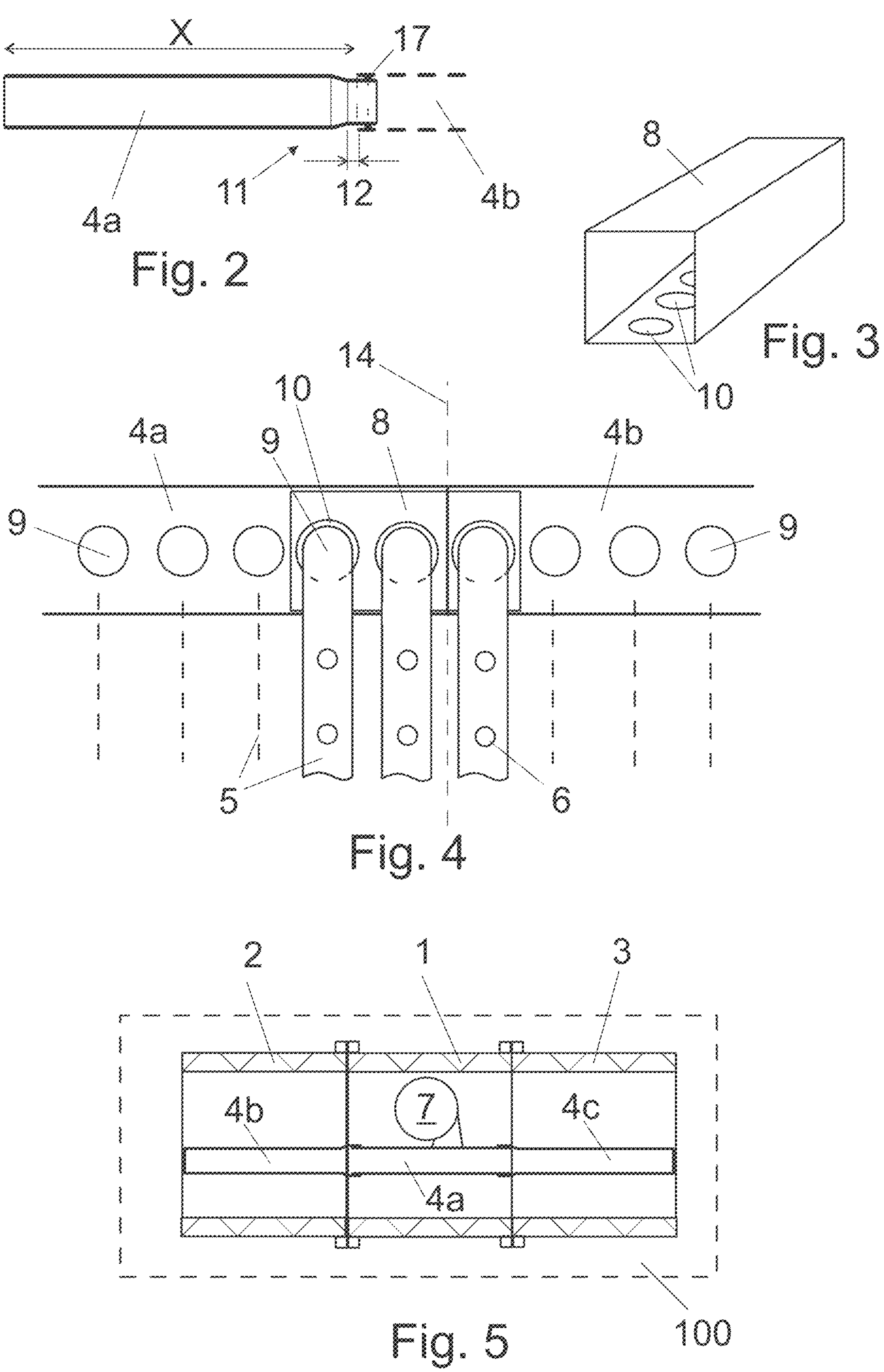
FIG. 2 is a schematic side view of a division channel.
FIG. 3 is a schematic view of a separate connector element.
FIG. 4 is a schematic view of a detail of a tempering furnace.
FIG. 5 is a schematic side view of three furnace portions connected to each other.

FIG. 2 is a schematic side view of a division channel. In one embodiment, one of the connected division channels 4*a* has a connection end 11 the cross-section of which size is reduced. Then, the end of another of the connected division channels 4*b* (shown by dashed line in FIG. 2) is arranged around said reduced connection end. In one embodiment, the diameter of the end of said another of the connected division channels 4*b* is extended, but in another embodiment, such as shown in FIG. 2, there is no extension.

In one embodiment, the connection ends 11 are dimensioned so that a play 12 is provided between the connected division channels 4*a*, 4*b* at room temperature. The play 12 arranges room for the connected division channels 4*a*, 4*b* to expand due to temperatures that prevails in use of the furnace. In one embodiment, the play 17 at room temperature is at least 20 mm.

Cross-sectional dimensions of the connection ends 11, i.e. their dimensions perpendicular to the lengthwise direction X, are preferably selected so that, on the one hand, there is as small clearance as possible in temperatures prevailing in use of the tempering furnace for preventing or at least reducing air leakage, but on the other hand, the clearance is so large that installation of the division channels is not hampered and that the connection ends may freely change their sizes due to temperature changes. In one embodiment, there is a 1-2 mm play in the cross-sectional dimensions of the connection ends 11 at room temperature.

In order to preventing or at least reducing the air leakage discussed above, one of the division channels is preferably dimensioned to extend inside another of the division channels is about 20 mm or more when the furnace 100 is in its heating or tempering use.

In one embodiment, a seal element 17 is arranged between connected connecting ends. The seal element 17 has an elastic structure that does not restrict movements of the connected connecting ends. The material of the seal element 17 may comprise e.g. heat resistant textile material or string(s).

FIG. 3 is a schematic view of a separate connector element, and FIG. 4 is a schematic view of a detail of a tempering furnace comprising said separate connector element.

In one embodiment, the division channel 4*a* of the first furnace portion is connected to the division channel 4*b* of the second furnace portion by a separate connector element 8, i.e. by an element that is not a part of said division channels, but which can be attached to one of the division channels 4*a*, 4*b* and arranged movable in relation to another of said division channels 4*a*, 4*b*. The separate connector element may be attached by welding or fastening devices, for instance.

In one embodiment, such as shown in FIG. 4, the separate connector element 8 is arranged inside of both of connected division channels 4*a*, 4*b*. In another embodiment, the separate connector element 8 is arranged inside of only one of the division channels, and outside of another of the connected division channels. In still another embodiment, the separate connector element 8 is arranged outside of both of connected division channels 4*a*, 4*b*.

In one embodiment, the separate connector element 8 arranged in its place in/on the division channels extends to at least one connecting opening 9 that connects the division channel 4*a*, 4*b* to the blow enclosure 5. Then the separate connector element 8 comprises an opening or openings 10 that allow(s) air flow from the division channel 4*a*, 4*b* to the blow enclosure(s) 5.

In one embodiment, the openings 10 of the separate connector element 8 are larger than the connecting openings 9 or have an oblong shape in order to ensure the separate connector element 8 does not cover or restrict the connecting openings 9 in temperatures prevailing in use of the tempering furnace. In the embodiment shown in FIG. 4, the openings 10 have a round shape the diameter of which is larger than the diameter of the connecting openings 9.

FIG. 5 is a schematic side view of three furnace portions 1, 2 3 connected to each other. Also, the division channels 4*a*, 4*b*, 4*c* of at least three furnace portions are connected. In one embodiment, the first furnace portion 1 that comprises the blower 7 is arranged between two other furnace portions 2, 3. In this embodiment, both ends of the division channel 4*a* of the first furnace portion 1 is connected to another division channel. In another embodiment, the first furnace portion 1 is arranged at one end of the furnace 100 and further furnace portions 2, 3 only on one side thereof.

Figure 6:
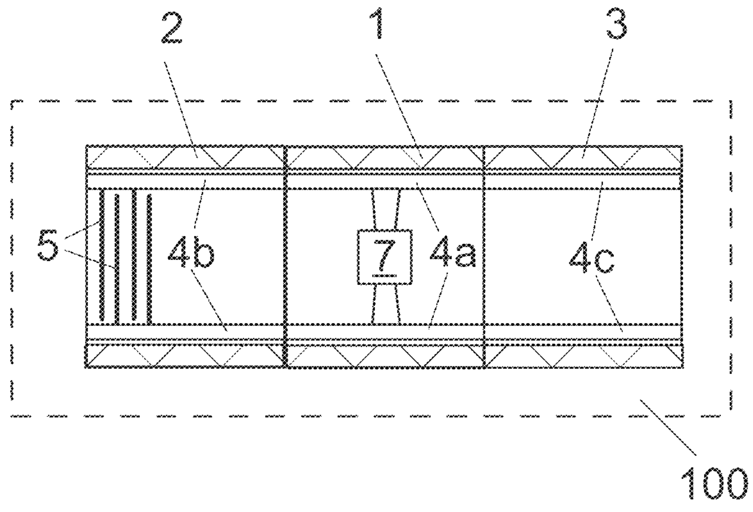
FIG. 6 is a schematic top view of another furnace.

FIG. 6 is a schematic top view of another furnace. In one embodiment, the furnace 100 has one division channel constructed from the connected division channels of the furnace portions as described in this description. Said division channel may be arranged e.g. on one side of the furnace.

In another embodiment, the furnace 100 comprises plurality of parallelly arranged complete division channels constructed from the connected division channels 4*a*, 4*b*, 4*c* of the furnace portions. In one embodiment, such as shown in FIG. 6, the furnace 100 comprises two complete division channels arranged on both sides of the furnace and constructed from the connected division channels 4*a*, 4*b*, 4*c*. In one embodiment, the successive and parallelly arranged blow enclosures 5 are connected alternately to the division channels. It is to be noted that only a portion of the blow enclosures are shown in FIG. 6 for the sake of clarity.

In one embodiment, such as shown in FIG. 6, the furnace 100 comprises one blower 7 in the first furnace portion 1 that is arranged to feed two or more parallelly arranged complete division channels. In another embodiment, each of the parallelly arranged complete division channels is fed by a blower of its own, i.e. each of the blowers is arranged to feed only one complete division channel. These blowers can be arranged in a same furnace portion, or alternatively in different furnace portions.

The Figures are showing embodiments where division channels 4*a*, 4*b*, 4*c* are fed by just one blower 7. However, in some embodiments two or even more blowers 7 are configured to feed same division channels. In one embodiment, these two or more blowers are arranged in a same furnace portion. In another embodiment, said two or more blowers are arranged in in different furnace portions.

Figure 7:
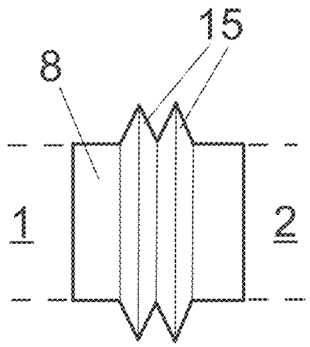
FIG. 7 is a schematic side view of another separate connector element.

FIG. 7 is a schematic side view of another separate connector element. In one embodiment, the separate connector element 8 has a structure that is less stiff than the first furnace portion 1 and the second furnace portion 2 connected by said separate connector element. This kind of separate connector element 8 can be fixedly attached to both connected furnace portions.

In one embodiment, the separate connector element 8 comprises at least one bellow 15 that extends around the separate connector element and allows said element to shorten and lengthen in the lengthwise direction X of the furnace so that connected division channels do not get broken. The bellow may be made of suitable metal, for instance.

Figure 8:
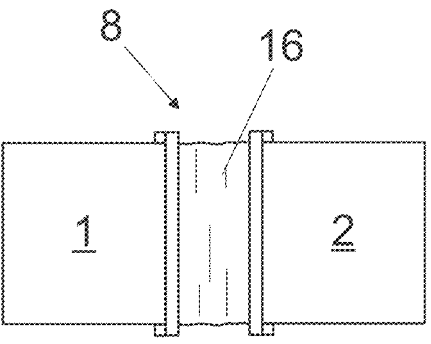
FIG. 8 is a schematic side view of third separate connector element attached between two furnace portions.

In another embodiment, such as shown in FIG. 8, the less stiff structure of the separate connector element 8 comprises a joint 16 that is made of flexible material, such as textile, fabric or cloth that stands high temperatures of the furnace.

The invention is not limited solely to the embodiments described above, but instead many variations are possible within the scope of the inventive concept defined by the claims below. Within the scope of the inventive concept the attributes of different embodiments and applications can be used in conjunction with or replace the attributes of another embodiment or application.

The drawings and the related description are only intended to illustrate the idea of the invention. The invention may vary in detail within the scope of the inventive idea defined in the following claims

REFERENCE SYMBOLS

1 first furnace portion
2 second furnace portion
3 third furnace portion
4*a-c* division channel
5 blow enclosure
6 blow opening
7 blower
8 separate connector element
9 connecting opening
10 opening
11 connection end
12 play
13 middle part
14 boundary
15 fold 16 joint
17 seal element
18 conveyor
19 glass sheet
20 heating element
100 tempering furnace
X lengthwise direction of the furnace

The invention claimed is:

1. A tempering furnace for a glass sheet, comprising a first furnace portion and a second furnace portion attached successively one after another in a lengthwise direction of said tempering furnace, wherein said furnace portions are configured to heat said glass sheet to a tempering temperature wherein:

each of said furnace portions comprising a division channel inside said furnace portion arranged in a lengthwise direction of said tempering furnace for dividing air to blow enclosures having blow openings from which heated air is discharged as heated air jets towards said glass sheet to heat said glass sheet to a tempering temperature;

said first furnace portion is provided with a blower configured for pressurizing air sucked from said tempering furnace and feeding said air to said division channel of said first furnace portion; wherein said division channel of said first furnace portion is connected to said division channel of said second furnace portion for leading air from said blower to said division channel of said second furnace portion; and one of said connected division channels is dimensioned to extend inside another of said connected division channels at least when in at temperatures prevailing during use of said tempering furnace.

2. The tempering furnace as claimed in of claim 1, wherein;

one of said connected division channels has a connection end, a cross-section of which is extended, and one end of another of said connected division channels is arranged inside said connection end.

3. The tempering furnace of claim 2, wherein;

said connection end is dimensioned for providing a play at room temperature which provides room for said connected division channels to expand due to temperatures prevailing during use of said tempering furnace.

4. The tempering furnace of claim 1, wherein;

one of said connected division channels has a connection end a cross-section of which is reduced, and one end of another of said connected division channels is arranged around said connection end.

5. The tempering furnace of claim 1, wherein;

said division channels of said two furnace portions are connected such that one of said connected division channels extends inside another of said division channel.

6. The tempering furnace of claim 1, wherein;

said division channels of said first furnace portion, said second furnace portion, and at least one additional furnace portion are connected.

7. The tempering furnace of claim 6, wherein:

said first furnace portion comprising said blower is arranged between said second furnace portion and said at least one additional furnace portion.

8. The tempering furnace of claim 1, wherein;

each said division channel is attached from its middle part to the corresponding furnace portion, and wherein ends of each said division channel are free to move due to thermal expansions.

9. The tempering furnace of claim 1, comprising:

said blower arranged to feed said division channels on opposite sides of said tempering furnace.

10. The tempering furnace of claim 1, comprising:

a glass plate conveyor, wherein:

said division channels, said blow enclosures and said blow openings are arranged for heating a glass plate arranged on said glass plate conveyor by said heated air jets blown towards at least one surface of said glass plate, and wherein said tempering furnace comprises structurally separate sequentially connected said first and said second furnace portions equipped with said division channels connected to each other, so that opposite arranged connection ends of said division channels may shift relative to each other as said division channels become thermally expandable and air can flow from one division channel to another division channel.

11. A method for assembling the tempering furnace of claim 1, said method comprising:

providing at least said first furnace portion and said second furnace portion;

attaching said at least first and said second furnace portions successively one after another in the lengthwise direction of said tempering furnace;

said attaching comprising connecting one or more division channels of said at least first and said second furnace portions to each other for supplying heated air from one of said at least first or second furnace portions to another of said furnace portions.

* * * * *